(12) United States Patent
Mohan et al.

(10) Patent No.: US 9,075,911 B2
(45) Date of Patent: Jul. 7, 2015

(54) SYSTEM AND METHOD FOR USAGE PATTERN ANALYSIS AND SIMULATION

(75) Inventors: Vinoth Kumar Mohan, Hyderabad (IN); Bhimesh Kumar Katta, Ramachandrapuram (IN)

(73) Assignee: General Electric Company, Schenectady, NY (US)

( * ) Notice: Subject to any disclaimer, the term of this patent is extended or adjusted under 35 U.S.C. 154(b) by 590 days.

(21) Appl. No.: 13/024,275

(22) Filed: Feb. 9, 2011

(65) Prior Publication Data

US 2012/0204150 A1 Aug. 9, 2012

(51) Int. Cl.
G06F 9/44 (2006.01)
G06F 11/36 (2006.01)

(52) U.S. Cl.
CPC .................. G06F 11/3612 (2013.01)

(58) Field of Classification Search
None
See application file for complete search history.

(56) References Cited

U.S. PATENT DOCUMENTS

| 6,112,186 | A | 8/2000 | Bergh et al. |
| 6,243,832 | B1 * | 6/2001 | Eckes et al. .................. 714/33 |
| 2004/0034638 | A1 | 2/2004 | Brown et al. |
| 2005/0216793 | A1 | 9/2005 | Entin et al. |
| 2007/0032992 | A1 * | 2/2007 | Trowbridge et al. .......... 702/193 |
| 2007/0043980 | A1 | 2/2007 | Ohashi et al. |
| 2009/0125581 | A1 | 5/2009 | Schneider |
| 2010/0271956 | A1 | 10/2010 | Diwakar et al. |
| 2010/0330954 | A1 | 12/2010 | Manning Cassett et al. |

FOREIGN PATENT DOCUMENTS

NZ          509606 A          1/2003

OTHER PUBLICATIONS

Search Report issued in connection with EP Patent Application No. 12154566.9, Apr. 20, 2012.
Office Action issued in connection with New Zealand Office Action 598077, Feb. 16, 2012.

* cited by examiner

Primary Examiner — Qamrun Nahar
(74) Attorney, Agent, or Firm — Parks Wood LLC (57) ABSTRACT

Systems and methods are provided for analyzing usage patterns. In certain embodiments, a system includes a scenario observer, a scenario associator, and a scenario analyzer. The scenario observer is configured to acquire event data relating to a plurality of events on a system having software and hardware, wherein the plurality of events comprises user input. The scenario associator is configured to associate the event data with a plurality of scenarios. The scenario analyzer configured to analyze the plurality of scenarios to identify usage patterns of the system.

20 Claims, 5 Drawing Sheets

| MODULE NAME (74) | SCENARIO (76) | USER STEPS (78) | NO. OF TIMES USED (80) | PERCENTAGE MATCH (82) | AVERAGE CPU / MEMORY USE (84) |
|---|---|---|---|---|---|
| LEAK ANALYSIS | A–(0, 445, 456, 502, 432, 555, 516) | 0: PERFORM MAP SELECTION OF MAINS<br>445: SELECT LEAK ANALYSIS TAB<br>456: SELECT 'FROM CURRENT SELECTION' FROM THE QUERY SELECT DROPDOWN<br>502: SELECT 'REPAIRED LEAKS'<br>432: SET 'SEARCH IN BY BUFFER DISTANCE'<br>555: PRESS RUN<br>516: EXPORT TO EXPLORER | 5 TIMES | 70% (B) | 60% / 80% |
| | B–(0, 54, 216, 343, 445, 456, 502, 432, 555, 516) | 0: PERFORM MAP SELECTION OF MAINS<br>54: COPY THE CURRENT SELECTION OBJECT TO THE CURRENT SET OF THE SCRAPBOOK<br>216: SET 'MINIMUM ON LEAKS ON A LINE'<br>343: CHECK OPTION 'SHOW RESULTS BY LEAKS'<br>445: SELECT LEAK ANALYSIS TAB<br>456: SELECT 'FROM CURRENT SELECTION' FROM THE QUERY SELECT DROPDOWN<br>502: SELECT 'REPAIRED LEAKS'<br>432: SET 'SEARCH IN BY BUFFER DISTANCE'<br>555: PRESS RUN<br>516: EXPORT TO EXPLORER | 6 TIMES | 60% (A)<br>90% (X1)<br>70% (X2) | 20% / 40% |

SYSTEM AND METHOD FOR USAGE PATTERN ANALYSIS AND SIMULATION

BACKGROUND OF THE INVENTION

The subject matter disclosed herein relates to pattern analysis and simulation, and more particularly, to systems and methods for analyzing and simulating usage patterns of hardware and software systems.

Hardware systems include components such as turbomachinery, sensors, actuators, and automation controllers. Software systems include executable processes capable of executing a variety of software behaviors such as loops, control structures, networking structures, and user interface structures. Users interact with the hardware and software components, for example, during development and testing of the hardware and the software components, by entering a variety of user inputs. Some of the user inputs may cause faults or unexpected results. Unfortunately, the number of possible inputs and input combinations is so large that testing for every possible input and input combination is not feasible.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a scenario observer, a scenario associator, and a scenario analyzer. The scenario observer is configured to acquire event data relating to a plurality of events on a system having software and hardware, wherein the plurality of events comprises user input. The scenario associator is configured to associate the event data with a plurality of scenarios. The scenario analyzer configured to analyze the plurality of scenarios to identify usage patterns of the system.

In a second embodiment, a non-transitory machine readable media is provided. The machine readable media comprises instructions to associate event data with a plurality of scenarios, wherein the event data relates to a plurality of events on a software-based system, and the plurality of events comprises user input. The machine readable media also comprises instructions to analyze the plurality of scenarios to identify usage patterns of the software-based system.

In a third embodiment, method is provided. The method includes associating event data with a plurality of scenarios, wherein the event data relates to a plurality of events on a software-based system, and the plurality of events comprises user input. The method also includes analyzing the plurality of scenarios to identify usage patterns of the software-based system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

Software and hardware products may undergo quality assurance or testing prior to release to customers. Testing may take certain forms, for example, automated software systems may be configured to randomly enter data into software to verify that the software does not fail or "crash." However, it is not possible to provide 100% testing coverage due to the size of certain input spaces (e.g., approximately equal to infinity). Further, a human may be included as an operator of certain systems, with a corresponding need to include a human factor element in the testing process. The disclosed embodiments are directed to techniques and systems for the analysis and simulation of usage patterns. The analysis and simulation of usage patterns may be used to enable a more accurate quality assurance or testing of hardware and software systems. In certain embodiments, the usage patterns may be categorized as having a heavy, medium, or light usage. Development resources such as engineering time, budget, and number of engineers may be more optimally allocated based on the usage pattern categories. Additionally, the usage patterns may be captured and analyzed for existing products. That is, a product already in the field may be analyzed and the analysis used in improving newer versions of the product.

In one embodiment, a user, such as a human operator, may be monitored while performing certain tasks. In another embodiment, a system, such as a software or hardware system, may also be monitored while performing certain tasks or events. The monitoring may then be analyzed and categorized into scenarios. For example, a scenario may include a subset of the events having certain start and end events. These start and end events may be hardware events and/or software events, as described in more detail below. The scenario may also include a subset of the events having a specific module or component focus, for example, events focused on starting a turbine engine. Additionally, the scenario may focus on hardware or software tasks, for example, a scenario may focus on copying/pasting certain geographic information system (GIS) map data from a first GIS system into second business operations system. Indeed, the scenario may include hardware and software events spanning multiple systems, including hardware and software systems.

The scenarios may be analyzed to derive a number of metrics and reports useful for product development and/or "debugging." For example, the scenario analysis may include usage patterns indicative of a real-world usage frequency, usage time, method of use, and/or system performance of software and/or hardware components. Accordingly, areas of the system that are involved in heavy use may be prioritized to receive additional development effort and scrutiny. System developers and engineers may thus use the scenario analysis to improve the system under development. Further, scenario simulations may then be used to refine any changes to the system. Indeed, an iterative development may include using the captured scenario data to simulate the scenario in a new and/or revised system. The new and/or revised system may then be analyzed by using the embodiments disclosed herein so as to further refine the system, and so on.

Figure 1:
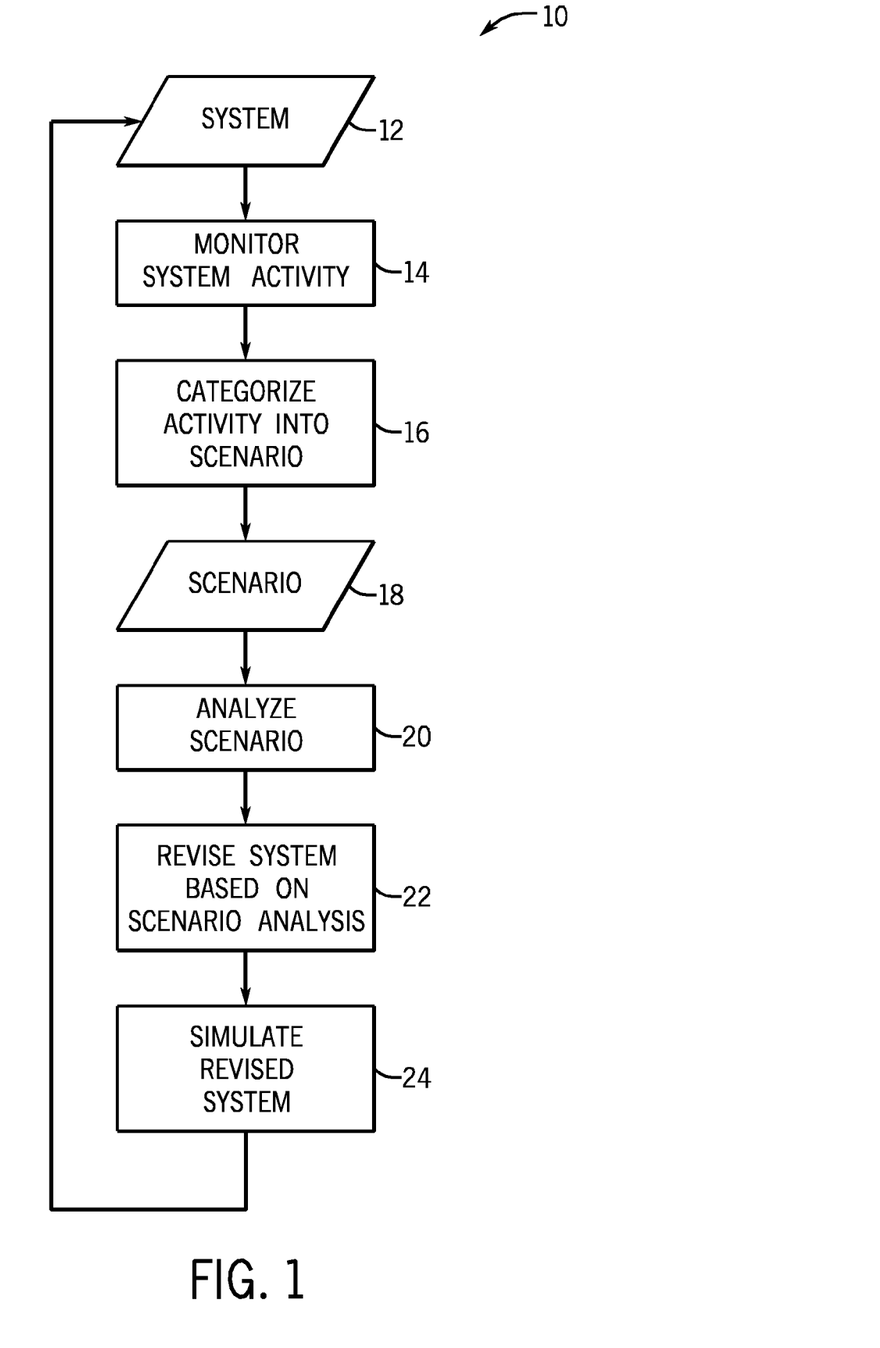
FIG. 1 is a flow chart of an embodiment of a logic suitable for enabling a development of a system.

With the foregoing in mind and turning now to FIG. 1, an embodiment of a logic 10 suitable for enabling a development of a system 12 is illustrated. The logic 10 may include non-transitory machine readable code or computer instructions that may be used by a computing device (e.g., workstation) to transform inputs, such as user and sensor inputs, into outputs such as a scenario analysis or report. The system 12 may be a software system, a hardware system, or a combination thereof. For example, the system 12 may be a computer program or computer instructions suitable for implementing logic, such as automation controller logic, embedded system logic, application software logic, operating system logic, or any combination thereof. The system 12 may also be a hardware system, such as an industrial system (e.g., turbomachinery, industrial plant hardware, power plant hardware, chemical plant hardware), a computer hardware (e.g., workstation, laptop), an automation controller (e.g., programmable logic controller), or a combination thereof.

The logic 10 may first monitor activity (block 14) of the system 12. For example, software "hooks" may be used to monitor activity in a software system, such as user activity (e.g., mouse movements, clicks, keyboard presses) and/or software activity (e.g., function calls, program counter state, register states, heap allocation, stack allocation, central processing unit (CPU) usage, memory usage, network usage, page file utilization). The software "hooks" may include system interrupts, event handlers, network handlers, virtual tables, and the like. Indeed, any suite suitable techniques useful for intercepting user and software activity may be used. Sensor signals may be used to monitor activity in a hardware system. For example, temperature sensors, load sensors, pressure sensors, flow sensors, and speed sensors may be used to monitor system activity (block 14). The monitored activity may then be categorized (block 16) into scenarios 18, as described in more detail below with respect to FIG. 3. The scenarios 18 may include user activity, sensor signals, and/or software activity related to a software module. For example, a scenario 18 may be based on all (or some) monitored activity occurring while using a module such as a map module of a GIS program. In another example, the scenario 18 may be based on monitoring all (or some) activity associated with a printing module, a leak analysis module, a network module, and so forth. Additionally, the scenarios 18 may also include activity from monitored hardware components. For example, a scenario 18 may include all activity directed at a turbine component such as a fuel nozzle, compressor, combustor, turbine engine, diffuser, and the like. Further, the scenarios 18 may be focused on a task, such as creating a GIS map, printing a file, collaborating with other users, starting a turbine, ramping up the turbine, ramping down the turbine, and/or shutting down the turbine.

The scenarios 18 may then be analyzed (block 20). In one embodiment, analysis of the scenario may include calculating scenario metrics, such as usage time for the scenario, frequency of use for a given time period (e.g., minutes, hours, days, weeks), percent use during a time period as compared to use for all scenarios, method of use (e.g., use through a touch screen, a mouse, mouse and keyboard, keyboard only, joystick, trackball, voice recognition) and/or metrics relating to system performance of software and/or hardware components. The analysis for software systems may include the derivation of scenario software usage metrics such as CPU utilization, memory utilization (e.g., heap, stack, virtual memory, paging), a list of function calls, the program counter state, the register states, network usage (e.g., bytes sent, bytes received, packet count, hop count), and so forth. Performance analysis for hardware systems is based on the type of hardware to be analyzed. For example, analysis of scenarios 18 for a turbine system may include scenario hardware usage metrics such as current load, shaft speed, fuel flow, number of cold starts, vibration, temperature, pressure, and the like.

The analyzed scenarios 18 may then be used to revise and improve the system under development (block 22). In one embodiment, usage patterns may be derived, such as the frequency of performing certain tasks (e.g., copying/pasting a map, typing the map legend, and entering a geographic location). In one embodiment, the usage patterns may be categorized as heavy use patterns, medium use patterns, and light use patterns. In another embodiment, a scale, such as a scale from 1 to 10, may be applied to the usage patterns. In this embodiment, a value of 10 may imply very heavy use while a value of 1 may imply low use. System developers may then prioritize fixes or enhancements to the observed components. The system may then be redesigned, for example, by eliminating the need to constantly copy/paste a map and related information by providing a dialog box that simplifies the multiple operations and places all the disparate controls in one single screen. Accordingly, a task that may have taken several minutes to perform may now take less than a minute. Likewise, a software process or module may be analyzed and the analysis used to improve the system 12. For example, the software process or module may be found to use a significant portion of the network bandwidth at certain times. Accordingly, the software process may be modified so that the network use is more evenly distributed over time. Similarly, a hardware process may be analyzed and improved. For example, during cold starts of a turbine system, a compressor may be found to lag behind due to thermal gradients. Accordingly, the compressor may be redesigned to minimize or eliminate the thermal gradients.

The scenario analysis (block 22) may also include an analysis of any error or "bugs" that may have occurred during usage. Indeed, the type and number of errors occurring during each scenario may now be captured and correlated to usage activity, process activity, and/or hardware activity. For example, certain errors may only occur when a certain combination of user actions (e.g., clicking on a button) occur during specific process activity (e.g., printing a file). The software executed when the button is pressed may be inadvertently overriding some memory used by a printer driver. Such an error may be more easily found and diagnosed using the techniques herein, including scenario capture and correlation analysis. Similarly, hardware errors may be logged and correlated to user and/or process activity. For example, turbine false starts may be logged and correlated with actions performed by an operator and with automated process activity. The analysis may show that false starts tend to occur when the operator ignites the turbine too soon and an automatic overload protection system becomes active. The system 12 may then be modified or revised to address any errors.

In certain embodiments, the scenarios 18 may be used to run a simulation in the revised system 12 (block 24). More specifically, the data captured during the monitor system activity (block 14) and associated with each scenario 18 may then be used to simulate the scenario on the revised system 12. Indeed, sufficient data may be captured (block 14) so as to enable a high fidelity simulation (block 24) of the activity that typically happens during a scenario 18. This activity may be replicated in the revised system 12 (block 24) and the results used to further refine or redesign the system 12. For example, the simulation may result in identifying new scenarios having a heavy, medium, or light use. Accordingly, development resources may then be prioritized and/or assigned based on the simulations. By iteratively developing a system 12 in this way, the scenarios 18 may substantially improve the resulting quality and performance of the system 12.

Figure 2:
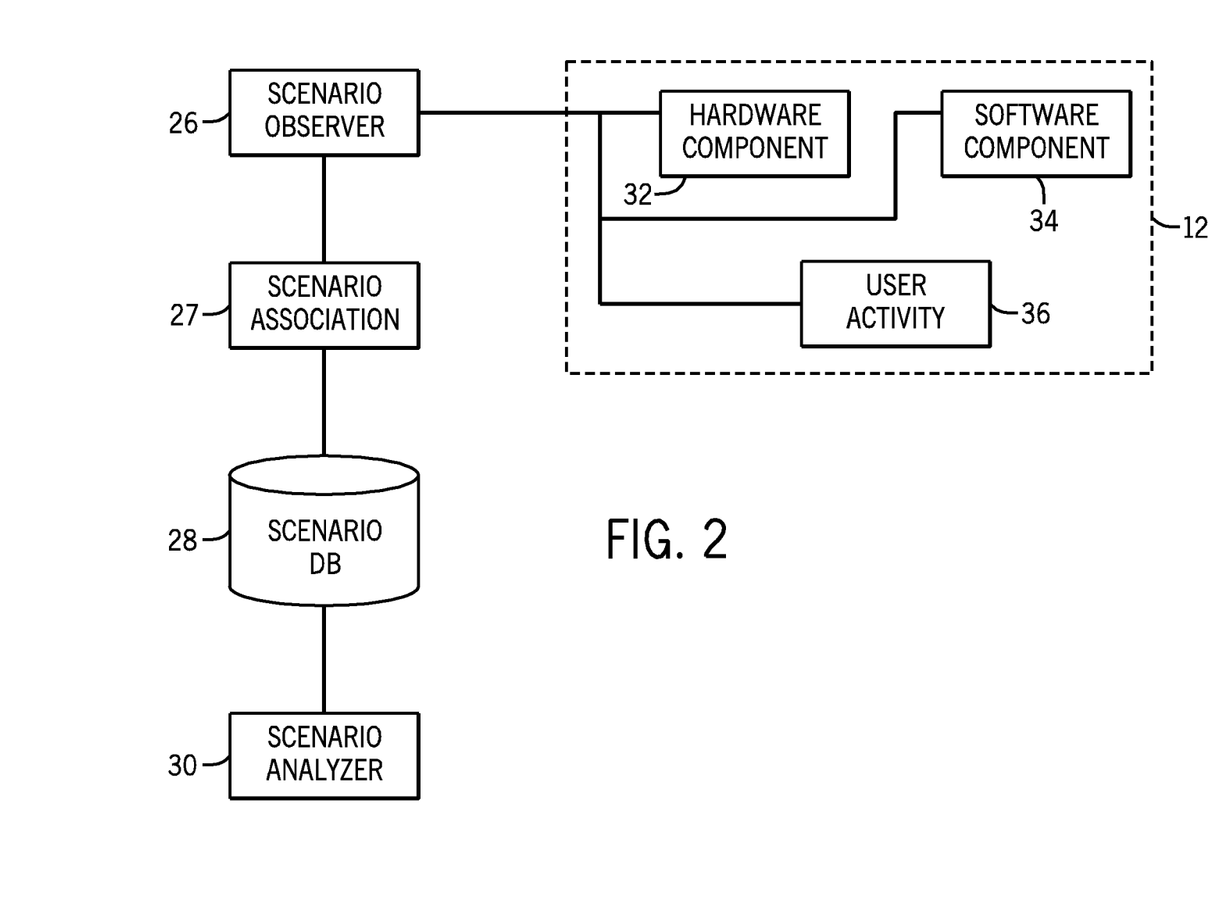
FIG. 2 is schematic diagram of embodiments of a scenario observer, a scenario analyzer, and a scenario association component.

FIG. 2 is a schematic diagram illustrative of an embodiment of a scenario observer 26, a scenario association component 27 (i.e., scenario associator), a scenario capture database 28, and a scenario analyzer 30. In the depicted embodiment, the scenario observer 26 is used to monitor and capture system 12 activity. The scenario observer may further include a hardware component observer 32, a software component observer 34, and a user activity observer 36. The hardware component observer 32 is configured to received and monitor hardware-based data for the system 12. For example, one hardware component observer 32 may be configured to monitor a turbine engine of the system 12, while a second hardware component observer 32 may be configured to monitor a compressor of the system 12. Any hardware component may be monitored, such as fuel nozzles, inlets, compressors, shrouds, turbine engines, diffusers, and the like. Similarly, the software component observer 34 may be configured to monitor a specific software module of the system 12. GIS map modules, printing modules, leak analysis modules, network modules, or any other software module may be monitored. It is to be noted that the software module may include any application module or any operating system module included in the system 12. More specifically, the application module may include a set of functions (or single function) developed to perform tasks in a user space, while the operating system module may include a set of functions (or single function) developed to perform tasks in a kernel or operating system space. Indeed, any software function or software task may be observed by the software component observer 34.

In one embodiment, the user activity observer 36 may be directed to observer the activity for a particular user of the system. In this embodiment, a user login or a user ID may be used to keep track of the user being monitored. In another embodiment, the user activity observer 36 may be directed to observe the activities of a group of users. Such a group may be defined in the scenario observer 26 or may be defined by the operating system. For example, the operating system may include a facility directed at grouping users and assigning certain user privileges to each group. The groups assigned by the operating system facility may thus be monitored by the user activity observer 36. Accordingly, user inputs such as a mouse input, touch screen input, a joystick input, a trackball input, a keyboard input, a voice input, a push button input, and/or a switch input, may be monitored by the user activity observer 36. Indeed, a variety of input devices may be monitored such as a mouse, a keyboard, a touch screen, a fingerprint reader, a microphone, and other peripheral devices (e.g., scanner, printer, display, video camera).

All monitored activity may then be used by the scenario associator 27 to create a scenario and link the activity associated to the scenario as described in more detail below with respect to FIG. 3. The scenario, as all as all monitored activity, may then be stored in the scenario capture database 28. The scenario capture database 28 may be any suitable database, such as a relational database, an object oriented database, a network database, a text file, or any other suitable repository. One relational database embodiment of the database 28 is described in more detail below with respect to FIG. 5. The scenario analyzer 30 may then use the database 28 to analyze the scenario, as described above in block 20 of FIG. 1. By associating activities with specific scenarios, development of the system 12 is improved because the scenario is reflective of real-world usage. Accordingly, the scenario may be analyzed to calculate a variety of metrics, and the analysis used to improve the system 12.

Figure 3:
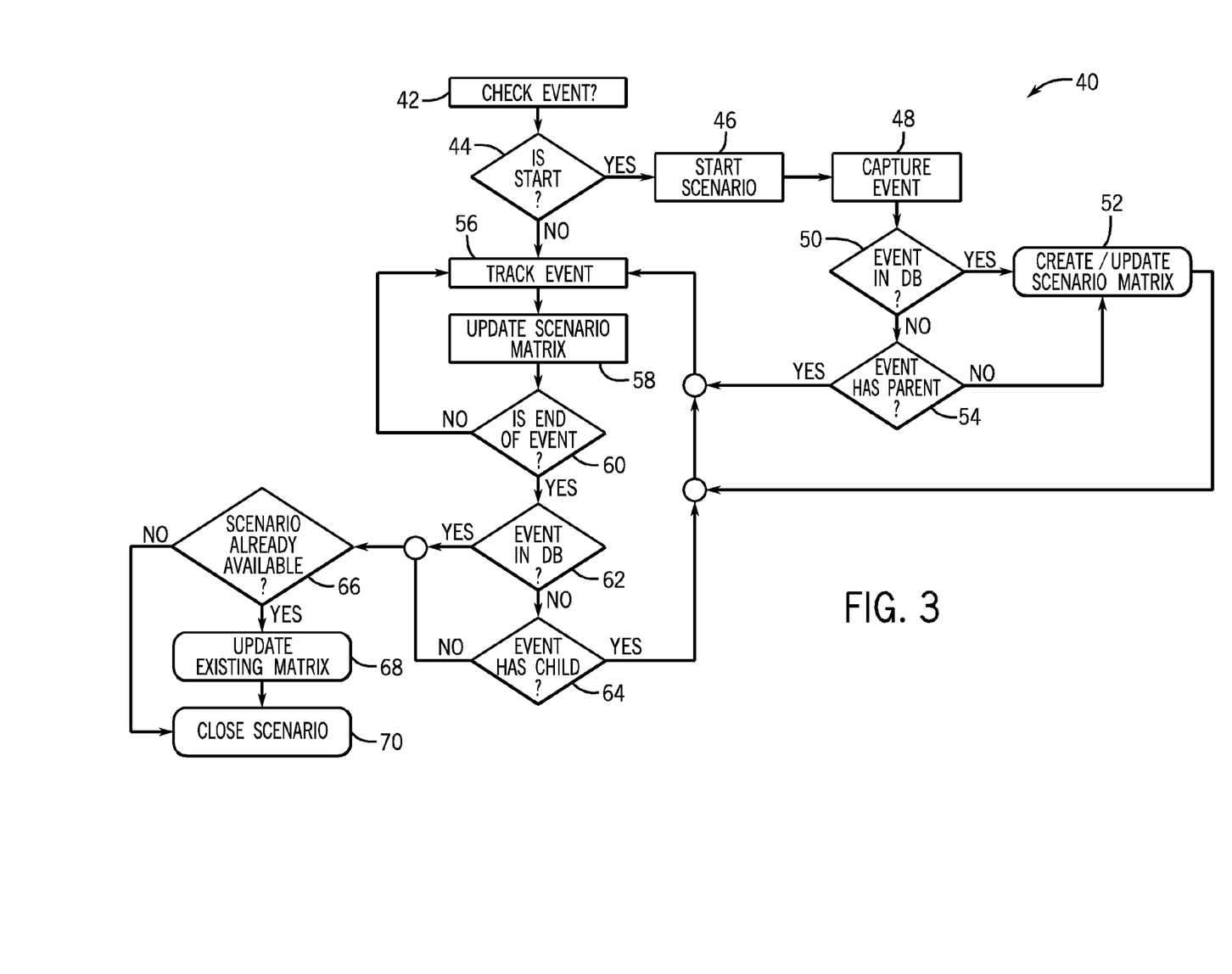
FIG. 3 is a flow chart of an embodiment of a logic suitable for categorizing data into scenarios.

FIG. 3 illustrates an embodiment of a logic 40 suitable for associating data received from the observers 32, 34, and 36, so as to categorize the data into scenarios. That is, all activity or events being monitored may be subsequently assigned as belonging to a scenario. The logic 40 first analyzes an event (block 42) to determine if the event is a start event (decision 44). Start events are a certain subset of the activity monitored by the observers 32, 34, and 36 corresponding to the first event in a scenario. For example, a scenario including printing of a text file may have the launching of a text editor as its start event. In another example, a scenario including the starting of a turbine engine may include engaging an electric motor to spin a shaft as the start event. All of the start events and their corresponding scenarios may be listed in the scenario database 28 of FIG. 2. Accordingly, each event may be compared to the list of start events to determine (decision 44) if the event is a start event.

If the event is a start event, the logic 40 may then start a scenario capture (block 46). That is, the logic 40 may now associate all captured activity or events with a specific scenario. Accordingly, the logic 40 may capture subsequent events (block 48) and compare the captured events to an event list in the scenario database (decision 50). If the event is found to be in the scenario database (decision 50), then the event is used to create or to update a scenario matrix (block 52). The scenario matrix is a grouping of events associated with the current scenario, as described in more detail below with respect to FIG. 4. The scenario matrix enables the association of a group of tasks to a given scenario, so as to track and update the scenario's usage and other metrics. In some instances, for example, when the event captured (block 48) is the start event, a scenario matrix record does not exist in the database. Accordingly, a new scenario matrix record is created (block 52) and will be updated as subsequent events are captured. In other instances, the event captured (block 48) is associated with a scenario matrix that has already been created. In these instances, the existing scenario matrix is then updated to reflect the newly captured event (block 52).

If the event is not listed in the database (decision 50), then the logic 40 determines if the event has a parent that is listed in the database (decision 54). All events may have child events, grandchild events, great-grandchild events, and so on. Indeed, a hierarchy of events may be used, with a parent event linking subsequent child events. For example, a "File" event may have a "Save File" child event. In turn, the "Save File" event may have a "Replace File" child event. Each child event may also be linked to one or more parent events. For example, the "Replace File" event may be a child event of "Save File As . . . ", "Save File", and "Create New File" events. Likewise, a "Print File" event may have a "Select File to Print" child event, which in turn may have a "Select Printer to Print" child event. If a parent event is found (decision 54), then further events are tracked (block 56) and the scenario matrix is updated (block 58). Updating the scenario matrix (block 58) includes adding the newly captured child event into the database and linking the captured child event to the parent event's scenario.

If the child event has no parent (decision 54), then the event is once again used to create or update the scenario matrix (decision 52), as described above, and the logic 40 may then continue tracking events (block 56). As events are tracked (block 56) and the scenario matrix is updated (block 58), the events are inspected to determine if an event is an end event (decision 60). End events are events that complete a scenario grouping of tasks. In other words, the end event is the last task in the scenario. For example, the scenario of printing a text file may include a "File Print Completed" dialog box pop-up as the end event. Likewise, the scenario of starting a turbine engine may include an end event related to the shaft achieving a certain minimum speed.

Once a determination has been made that the event is an end event (decision 60), then another determination is made to check for the event in the scenario database (decision 62). If the event is not in the scenario database, then a determination is made to check for child events (decision 64). As mentioned earlier, all events, including end events, may have children events, which in turn may have grandchildren events, and so on. Accordingly a determination is made to check if the end event may have any child events (decision 64). If the end event has child events, the then child events are tracked (block 56) and the scenario matrix is correspondingly updated (block 58).

If it is determined that the end event is in the scenario database (decision 62) or that the end event has no children (decision 64), then a determination is made to check if the scenario is already available (decision 66). That is, a determination is made to verify that a scenario is currently being monitored (decision 66). If a scenario is available (decision 66), then the scenario matrix is updated with the end event information (block 68) and the scenario is closed (block 70). Likewise, if the scenario is not already available (decision 66), then any scenario is closed (block 70). Closing the scenario (block 70) may terminate the linking or association of further monitored activity with the scenario being closed. The monitored scenario data may then be further analyzed, for example, to derive scenario usage metrics. The logic 40 provides for a suitable way of associating a hierarchy of events such as user events, software events, and hardware events, to one or more scenarios. The scenarios may then be analyzed to calculate a variety of scenario metrics and other information useful in developing and/or debugging the system 12.

Figure 4:
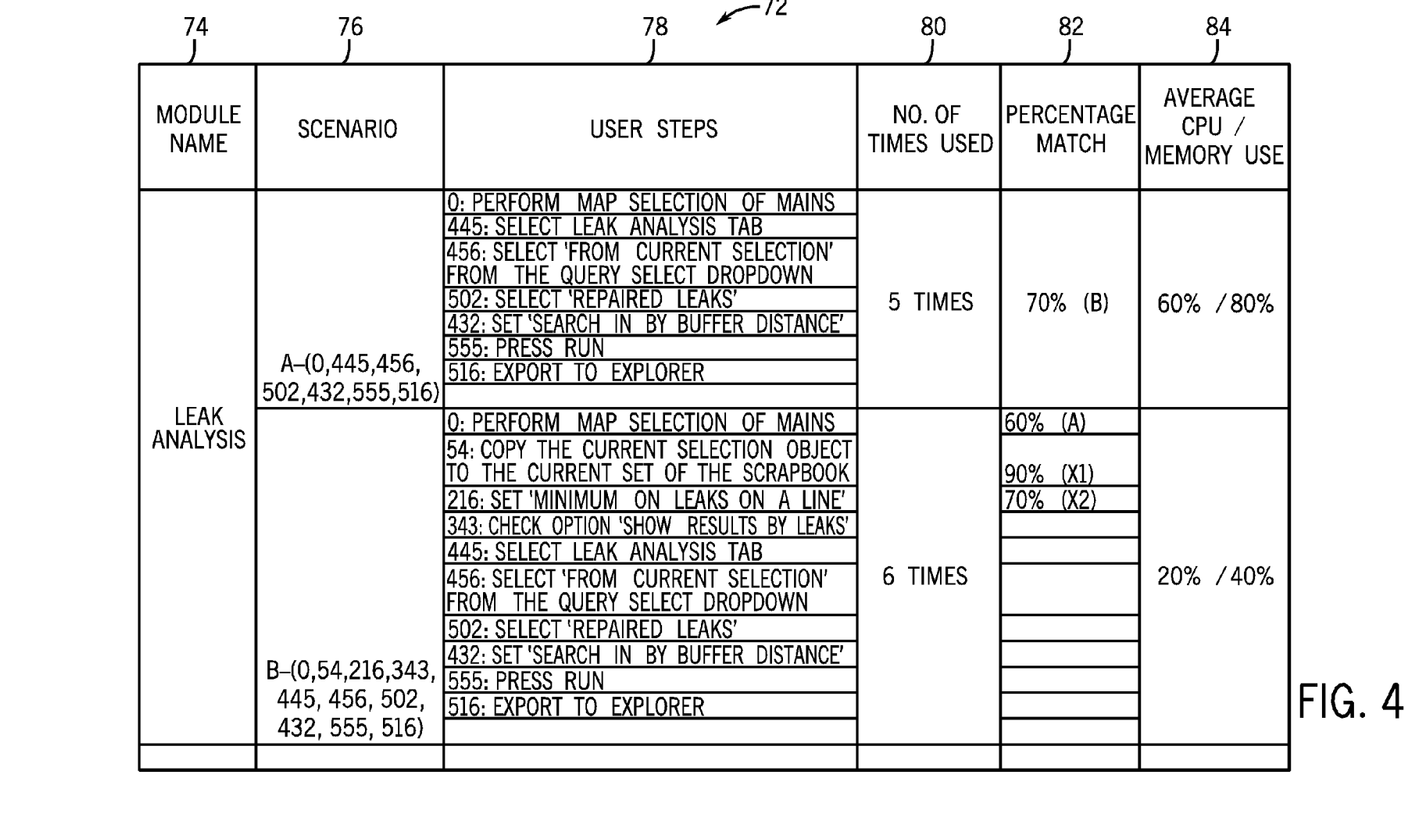
FIG. 4 depicts an embodiment of a scenario matrix.
Figure 5:
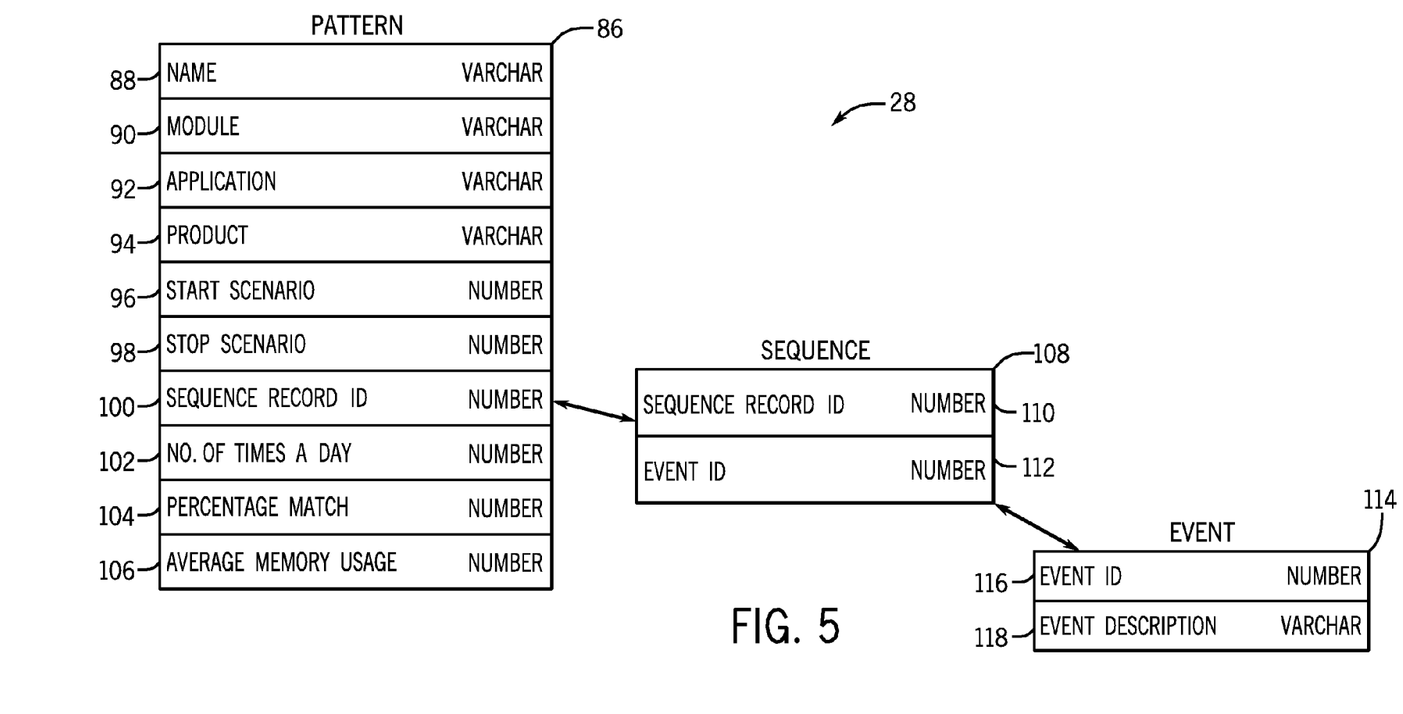
FIG. 5 depicts an entity relationship diagram of an embodiment of a scenario database.

FIG. 4 illustrates an embodiment of a scenario matrix 72 storing two scenarios "A" and "B." In one embodiment, the scenario matrix 72 may be derived by the scenario analyzer 30 (shown in FIG. 2) using the logic 40 of FIG. 3 and the database of FIG. 5. Additionally, the scenario matrix 72 may be used to generate a report suitable for comparing or otherwise analyzing one or more scenarios. Indeed, the scenario matrix 72 may be used to improve the capabilities of the system 12 as well as to "debug" the system 12. In the illustrated embodiment, the scenario matrix 72 includes columns "Module Name" 74, "Scenario" 76, "User steps" 78, "No. of Times Used" 80, "Percentage match" 82, and "Average CPU/ Memory Use" 84. The "Module Name" column 74 stores the name of the module or component associated with certain scenarios stored in the "Scenario" column 76. In the depicted embodiment, the module "Leak Analysis" of the system 12 is associated with scenarios "A" and "B." The "User steps" column 78 stores the user events or steps captured, for example, by the user activity observer 36 (shown in FIG. 2). Scenario "A" is shown as having seven captured events, while Scenario "B" is shown as having ten captured events. The event identifiers for each event associated with a scenario are also shown. Scenario "A" has events "0", "445", "456", "502", "432", "555", and "516." Likewise, Scenario "B" has events "0", "54", "216", "343", "445", "456", "502", "432", "555", and "516." As mentioned above, each event identifier uniquely identifies an event. For example, the identifier "0" uniquely identifies the event "Perform map selection of mains", while the identifier "445" uniquely identifies the event "Select Leak Analysis Tab."

The scenario matrix 72 also includes columns useful in analyzing the scenario and events. For example, the "No. of Times Used" column 80 may store the number of times that the scenario was used during a certain time period, such as a day. In the depicted example, Scenario "A" is shown as being used five times during the day, while scenario "B" has been used six times during the day. The "No. of Times Used" usage scenario metric enables developers to gauge usage patterns and to redesign or develop the system 12 to more effectively provide support for the monitored scenarios. In the illustrated example, scenario "B" is used more than scenario "A" and includes more user events. Accordingly, the "Leak Analysis" module of system 12 may be further refined to reduce the number of user actions involved in scenario "B."

Other columns useful in analysis of scenarios include the "Percentage match" column 82 and the "Average CPU/ Memory Use" column 84. The "Percentage match" column 82 is useful in comparing events across scenarios. More specifically, the "Percentage match" column 82 is a scenario match usage metric that enables a comparison of the percentage of events that are shared across scenarios. For example, if a first scenario has a single event with identifier "0" and a second scenario has two events including the event with identifier "0", then the first scenario would have 50 percent match with the second scenario because the first scenario has half of the events in the second scenario. In the illustrated example, scenario "A" has a 70 percent match with scenario "B." Additionally, scenario "B" has a 60 percent match with scenario "A", a 90 percent match with scenario "X1", and a 70 percent match with scenario "X2." The "Percentage match" column may be used to analyze how closely scenarios relate to each other. Accordingly, development decisions may be made to improve the system 12. For example, if the scenarios are too closely related, then this may be an indication that the system 12 is providing too many mechanisms or avenues for performing the same task. Accordingly, the system 12 may be redesigned to eliminate some of these mechanisms. Likewise, a low commonality between scenarios may be indicative of an overly-complex system 12 providing too few shared mechanism to perform tasks. System complexity may be reduced by adding more common functions, graphical interfaces, and the like.

The "Average CPU/Memory Use" column 84 may be used to track the percentage of CPU resources and the percentage of memory used during the scenario. In the illustrated example, scenario "A" has used 60% of the CPU and 80% of the memory. By way of comparison scenario "B" has only used 20% of the CPU and 40% of the memory. Since scenario "B" includes more events than scenario "A", the higher "Average CPU/Memory Use" metric for scenario "A" may be indicative that one of the functions has a memory leak and/or perhaps a deadlocked process (e.g., process that does not properly terminate). Accordingly, debugging scopes or other techniques suitable for locating and repairing the leak or deadlock may be used. It is to be understood that, in other embodiments, other columns may be added to scenario matrix 72. For example, the other columns may store other scenario metrics such as type and number of function calls used, program counter state, register states, heap allocation metrics, stack allocation metrics, CPU usage metrics, number of "bugs" found (i.e., "bug" count), and/or network usage metrics.

The scenario analyzer 30 (shown in FIG. 2) may also categorize the scenarios in the scenario matrix 72 by scenario usage metrics such as a high usage, medium usage, or low usage scenario. That is, the scenario usage metric may be used to assign a usage level to scenarios. In one embodiment, certain metrics such as "No. of Times Used" 80, and "Average CPU/Memory Use" 84 may be compared to certain ranges and used to categorize a scenario. For example, if the "No. of Times Used" 80 metric exceeds approximately 100 times a day, then the scenario may be classified as high use. Likewise, if the "No. of Times Used" 80 metric is approximately between 50 to 100 times a day, then the scenario may be classified as medium use. Finally, if the "No. of Times Used" 80 metric is less approximately 50 times a day, then the scenario may be classified as low use. It is to be understood that the actual values to classify usage (e.g., high, medium, or low usage) depends on the type of user (e.g., system administrator, regular user) and the type of software or hardware system. Certain systems, like email systems, may be always left running, and thus, the values used to classify such systems may be very different (and higher). Other systems, such as turbine shutdown systems, may be used rarely. Accordingly, the values used to classify turbine shutdown systems may also be different (and lower). Other metrics such as the "Average CPU/Memory Use" 84 may also take into account the type of user and system to provide for ranges classifying a scenario as a heavy use, medium use, or low use scenario. In this way, the scenario analyzer 30 may be used to categorize all scenarios in the scenario matrix 72. Such categorizes may then be utilized to more efficiently allocate development resources.

FIG. 5 depicts an entity-relationship (ER) diagram of an embodiment of a scenario database 28. As mentioned above, the scenario database 28 may include relational database embodiments, as illustrated. A scenario "Pattern" table 86 may include a set of columns 88, 90, 92, 94, 96, 98, 100, 102, 104, and 106 suitable for storing usage pattern information for a scenario. In the depicted embodiment, the "Pattern" table 86 includes a "Name" column 88, a "Module" column 90, an "Application" column 92, a "Product" column 94, a "Start scenario" column 96, a "Stop Scenario" column 98, a "Sequence record id" column 100, a "No of times a day" column 102, a "Percentage Match" column 104, and an "Average memory usage" column 106. The columns may have suitable data types, such as a variable character (i.e., varchar) data type or a number data type. The varchar data type allows for textual data of varying length. That is, the varchar data type enables the storage of text having varying lengths. The number data type enables the storage of columns having numeric data.

The "Name" column 88 may be used to store that name of the pattern, while the "Module" column 90 may be used to store the name of a component or module associated with the named pattern. That is, a software component or a hardware component may be stored in the "Module" column 90. For example, a usage pattern named "Create GIS Map" 88 may be associated with a "Create_2D_MAP_Java" module 90. The "Application" and "Product" columns 92 and 94 are associated with the name of an application and the name of a product, respectively. For example, the "Application" column 92 may be used to store the name of software or hardware applications such as supervisory control and data acquisition (SCADA), human machine interface (HMI), and/or programmable logic controller (PLC) software or hardware. The product column 94 may store the name of a product sold to customers, such as the ENMAC™ software or the MS-7000FA turbine system available from General Electric Co. of Schenectady, N.Y. Indeed, any software and/or hardware product and application may be stored. The "Start Scenario" column 96 may be used to associate or link a start event to the named pattern or scenario. Accordingly, the "Start Scenario" column 96 may be used to store the event that was captured and used as the start event for the scenario. Likewise, the "Stop Scenario" column 98 may be used to store the event that was captured and used as the end event for the scenario.

The "Sequence record id" column 100 is used to group the captured data sequentially. That is, the "Sequence record id" column 100 may be used in conjunction with a "Sequence" table 108 to track the sequence of events that were captured during the monitoring of the named pattern, as described in more detail below. The "No of times a day" column 102 may be used to store the number of times a day that the named pattern is typically used. The "Percentage Match" column 104 is used to store a scenario metric that associates scenarios or patterns with each other. More specifically, the "Percentage Match" column 104 may be used to track the percentage of events that two (or more) scenarios may share with each other, as described above with respect to FIG. 4. The "Average memory usage" column 106 is used to store a scenario metric that calculates how much memory (e.g., random access memory (RAM)) was used, on average, during the scenario. It is to be understood that, in other embodiments, additional columns may be used. For example, the columns may store other scenario metrics such as type and number of function calls used, program counter state, register states, heap allocation metrics, stack allocation metrics, CPU usage metrics, number of "bugs" found (i.e., "bug" count), and/or network usage metrics.

The "Sequence" table 108 includes two columns, a "Sequence record id" column 110 and an "Event id" column 112. The "Sequence record id" column 110 may be incrementally supplemented to keep track of the sequence of associated events. As events are monitored and captured, the events get assigned an increasing sequence number and stored in the "Sequence" table 108. Accordingly, an "Event" table 114 is used to store all of the unique events for the system 12. The table 114 includes an "Event id" column 116 to store the identifier for each unique event. By using the columns 112 and 116, the "Sequence" table 108 enables a linkage to the "Event" table 114. Likewise, by using columns 100 and 110, the "Sequence" table 108 enables a linkage to the "Pattern" table 86. Indeed, the linkages may be a one-to-one, a one-to-many, many-to-one, or many-to-many relationship between patterns, sequences, and events.

The tables 86, 108, and 114 may be used by the scenario analyzer 30 (shown in FIG. 2) to derive a scenario matrix, such as the scenario matrix 72 (shown in FIG. 4), and to analyze the derived scenarios. For example, the scenario analyzer 30 may calculate modules having high usage patterns, and provide a report detailing which scenarios include the high usage patterns. Indeed, low and medium usage patterns may also be discovered by the scenario analyzer 30. Development resources may be better utilized by focusing on modules and scenarios that exhibit high usage. Likewise, modules and scenarios exhibiting a higher than average "bug" count may be given higher development priority. Indeed, the scenario analyzer 30 may use the scenario database 28 to substantially improve the allocation of development resources by targeting modules and/or scenarios based on metrics derived from the data stored in the database 28.

Technical effects of the invention include the ability to monitor user activity, software activity, and hardware activity for a system, while categorizing the monitored activity into scenarios. Multiple start and end events may be used to aid in categorizing the monitored activity as belonging to specific scenarios. The monitoring may also include deriving metrics for each scenario useful in debugging and refining the system. The scenario and derived metrics may then be analyzed to determine components of the system that would benefit from re-design or re-development. Further, the techniques disclosed herein may be used in existing systems deployed at customer sites or in new systems not yet released to the market.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
    a processor configured to execute:
    a scenario observer configured to acquire event data relating to a plurality of events on a system having software and hardware, wherein the plurality of events comprises user input;
    a scenario associator configured to associate the event data with a plurality of scenarios by identifying a scenario start event included in a first scenario and assigning all subsequent event data to the first scenario;
    a scenario analyzer configured to analyze the plurality of scenarios to identify usage patterns of the system; and
    a simulation of a revised system, wherein the simulation receives the usage patterns as input and derives simulated activities of the revised system, wherein the scenario observer is configured to select the scenario start event by querying a repository storing a plurality of user-reconfigurable start events comprising the scenario start event and a second scenario start event, and wherein the scenario associator is configured to apply the scenario start event in a first logging run of the first scenario and to apply the second scenario start event in a second logging run of the first scenario.

2. The system of claim 1, wherein the scenario observer comprises a user activity observer, a software component observer, and a hardware component observer.

3. The system of claim 1, wherein the scenario observer is configured to monitor a plurality of user input devices of the system, a software process, a hardware activity, or a combination thereof.

4. The system of claim 1, wherein the scenario associator is configured to stop assigning event data to the first scenario by identifying an end event included in the first scenario.

5. The system of claim 1, wherein the scenario associator is configured for at least one of creating a new scenario, updating an existing scenario, or correlating the plurality of scenarios.

6. The system of claim 1, wherein the scenario analyzer is configured to analyze the plurality of scenarios to identify the usage patterns with metrics, and the metrics comprise a scenario usage metric indicating a frequency or number of uses of each scenario in the plurality of scenarios.

7. The system of claim 1, wherein the scenario analyzer is configured to analyze the plurality of scenarios to identify the usage patterns with metrics, and the metrics comprise a scenario match metric indicating a degree of match between each scenario and other scenarios in the plurality of scenarios.

8. The system of claim 1, wherein the scenario analyzer is configured to analyze the plurality of scenarios to identify the usage patterns with metrics, the metrics comprise a hardware usage metric and a software usage metric, the hardware usage metric indicates a degree of usage of one or more hardware components of the system, and the software usage metric indicates a degree of usage of one or more software components of the system.

9. The system of claim 1, wherein the scenario analyzer is configured to analyze the plurality of scenarios to identify the usage patterns to prioritize changes to the system.

10. The system of claim 9, wherein the usage patterns comprises a plurality of different usage levels from low usage to high usage.

11. The system of claim 1, comprising a scenario database comprising scenario pattern data, event sequences, and event descriptions for each event in the plurality of events.

12. A non-transitory machine readable media, comprising:
    instructions to associate event data with a plurality of scenarios by identifying a scenario start event included in a first scenario and assigning all subsequent event data to the first scenario, wherein the event data relates to a plurality of events on a software-based system, and the plurality of events comprises user input;
    instructions to analyze the plurality of scenarios to identify usage patterns of the software-based system; and
    instructions to simulate a revised system by using a simulator, wherein the simulator receives the usage patterns as input and derives simulated activities of the revised system, wherein the instructions are configured to select the scenario start event by querying a repository storing a plurality of user-reconfigurable start events comprising the scenario start event and a second scenario start event, and wherein the instructions are configured to apply the scenario start event in a first logging run of the first scenario and to apply the second scenario start event in a second logging run of the first scenario.

13. The non-transitory machine readable media of claim 12, wherein the instructions to associate event data comprise instructions to stop assigning event data to the first scenario by identifying an end event included in the first scenario.

14. The non-transitory machine readable media of claim 12, wherein the instructions to associate event data comprise instructions configured for at least one of creating a new scenario, updating an existing scenario, or correlating the plurality of scenarios.

15. The non-transitory machine readable media of claim 12, wherein the instructions to analyze the plurality of scenarios comprise instructions to identify the usage patterns with metrics, the metrics comprise a scenario usage metric and a scenario match metric, the scenario usage metric indicates a frequency or number of uses of each scenario in the plurality of scenarios, and the scenario match metric indicates a degree of match between each scenario and other scenarios in the plurality of scenarios.

16. The non-transitory machine readable media of claim 15, wherein the metrics comprise a hardware usage metric indicating a degree of usage of one or more hardware components of the software-based system, and a software usage metric indicating a degree of usage of one or more software components of the software-based system.

17. The non-transitory machine readable media of claim 12, wherein the instructions to analyze the plurality of scenarios comprise instructions to prioritize improvements to the software-based system based on the usage patterns.

18. The non-transitory machine readable media of claim 12, comprising instructions to observe and acquire the event data relating to the plurality of events, wherein the plurality of events include user activity events, hardware component events, and software component events.

19. A method, comprising:
   selecting a scenario start event by querying a repository storing a plurality of user-reconfigurable start events comprising the scenario start event and a second scenario start event;
   associating event data with a plurality of scenarios by identifying the scenario start event included in a first scenario and assigning all subsequent event data to the first scenario, wherein the event data relates to a plurality of events on a software-based system, and the plurality of events comprises user input;
   analyzing the plurality of scenarios to identify usage patterns of the software-based system; and
   executing a simulation of a revised system, wherein the simulation receives the usage patterns as input and derives simulated activities of the revised system, wherein the associating the event data comprises applying the scenario start event in a first logging run of the first scenario and applying the second scenario start event in a second logging run of the first scenario.

20. The method of claim 19, comprising monitoring and acquiring the event data relating to the plurality of events, and prioritizing improvements to the software-based system based on the usage patterns, wherein the plurality of events include user activity events, hardware component events, and software component events.

* * * * *